United States Patent [19]

Krieg et al.

[11] Patent Number: 5,690,872
[45] Date of Patent: Nov. 25, 1997

[54] METHOD FOR THE PRODUCTION OF HIGHLY FILLED POLYMETHYL METHACRYLATE BASED PLASTICS

[75] Inventors: Manfred Krieg, Darmstadt; Guenther Ittmann, Gross-Umstadt, both of Germany

[73] Assignee: Roehm GmbH Chemische Fabrik, Darmstadt, Germany

[21] Appl. No.: 612,446

[22] Filed: Mar. 7, 1996

[30] Foreign Application Priority Data

Mar. 7, 1995 [DE] Germany ............ 195 07 875.6

[51] Int. Cl.$^6$ ............................................. B29C 39/12
[52] U.S. Cl. ................ 264/73; 264/245; 264/331.18; 264/347
[58] Field of Search ............... 264/73, 245, 331.18, 264/347

[56] References Cited

U.S. PATENT DOCUMENTS

| | | | |
|---|---|---|---|
| 3,095,400 | 6/1963 | Martino et al. | 264/73 |
| 4,159,301 | 6/1979 | Buser et al. | 264/331.15 |
| 4,366,285 | 12/1982 | Lukaschek et al. | 524/521 |
| 4,446,177 | 5/1984 | Munoz et al. | 428/15 |
| 4,786,660 | 11/1988 | Ittmann et al. | 524/265 |
| 4,826,901 | 5/1989 | Ittmann et al. | |
| 5,244,941 | 9/1993 | Bruckbauer et al. | 523/171 |
| 5,280,051 | 1/1994 | Traverso et al. | 264/73 |
| 5,464,898 | 11/1995 | Ittmann et al. | |
| 5,588,599 | 12/1996 | Novak | 241/23 |

FOREIGN PATENT DOCUMENTS

| | | | |
|---|---|---|---|
| 52-12265 | 1/1977 | Japan | 264/73 |
| 56-9261 | 1/1981 | Japan | 264/73 |

Primary Examiner—Jeffery R. Thurlow
Attorney, Agent, or Firm—Oblon, Spivak, McClelland, Maier & Neustadt, P.C.

[57] ABSTRACT

A method for the casting of highly filled plastics containing polymethyl methacrylate, the method involving:

preparing a filler suspension by combining from 30 to 80 wt %, based on the amount of filler suspension, of at least one particle-shaped, inorganic filler with a polymer precursor under high-speed stirring, wherein the polymer precursor is made from methyl methacrylate and a polymethyl methacrylate prepolymer, wherein the filler suspension further contains from 1 to 20 parts by weight, based on the amount of filler suspension, of a colored, filled, comminuted polymer material having a density precisely adapted to the density of the filler suspension and wherein the comminuted polymer material contains a polymer component which is highly crosslinked; and polymerizing the filler suspension by contacting the filler suspension with at least one radical initiator.

20 Claims, No Drawings

5,690,872

METHOD FOR THE PRODUCTION OF HIGHLY FILLED POLYMETHYL METHACRYLATE BASED PLASTICS

BACKGROUND OF THE INVENTION

1. Field of the Invention

The invention relates to a method for the production of highly filled plastics based on polymethyl methacrylate, in particular those having a granite appearance.

2. Discussion of the Background

Highly filled cast resin molded articles having granite appearance, especially those based on polymethylmethacrylate (PMMA), have attained a high level of importance in the bathroom sector, as well as other household sectors. The content of mineral filler material usually lies in the range of 30–80 wt %.

Methods for producing such products have been disclosed, for example, in West German Patent No. A 2,627,081, U.S. Pat. No. 4,159,301, WO 90/01,470, and WO 91/11,404.

West German Patent No. A 2,627,081 provides for the use of two types of particles in an irregular distribution. The first type of particles are colored or uncolored, nontranslucent particles, and the second type of particles are colored or uncolored translucent or transparent particles, wherein both types of particle exhibit, in the smallest dimension, a minimum particle size of >200 µm.

For the production of plates with a granite appearance, Japanese Patent No. A 02,202,445 (Chem. Abstr. 114, 8000t) recommends the extrusion coating of thermoplastic slabs with a layer containing metal powder and white pigment. A granite appearance is also attained with kitchen sinks and bathroom articles made of acrylic resin by using granite filler particles (see Modern Plastics International, September 1991, page 32). The objects thus produced have a filler concentration in the vicinity of the surface.

In the production of objects made of highly filled PMMA, one conventionally begins with a liquid polymer precursor, to which the filler material is added and which is then polymerized by radical means according to a type of chamber polymerization.

The production, which starts with a polymer precursor consisting of 70 to 95 parts by weight methyl methacrylate and 5 to 30 parts by weight of a PMMA prepolymer PP and perhaps up to approximately 5 parts by weight of a crosslinking monomer and perhaps up to 5 parts by weight of a silanization agent SIM, has proved good. With high-speed stirring, particle-shaped, inorganic fillers, in particular aluminum hydroxide or aluminum oxide hydrate, An fractions of 30 to 80 wt % (based on the formed filler suspension FSS), are added to such a polymer precursor and uniformly distributed.

A common way of dyeing granite-like polyacrylate material consists in stirring into a highly filled filler suspension FSS variously colored comminuted material particles with particle diameters up to approximately 5 mm and in subsequently performing the polymerization. The variously colored comminuted material particles are those from the cured, filled polymer material itself, for example, comminuted recycling material. Practical experience teaches, however, that at least two serious problems occur in the case of the incorporation of filled, ground PMMA polymer material:

The comminuted material particles sediment as a function of their particle size and affect the time to attain the gel state of the polymerization in very different ways, so that a reproducible structure cannot be attained.

Additionally, the comminuted material particles from recycled material swell in the filler suspension FSS so rapidly that the viscosity increase that occurs makes the filling of the polymerization reactors almost impossible and at best a faded structure is formed.

SUMMARY OF THE INVENTION

Accordingly, one object of the present invention is to provide a method for the preparation of highly filled plastics which permits the incorporation of filled, comminuted polymer material, while avoiding the above problems and the resulting disadvantageous consequences for the formed polymer material.

These and other objects of the present invention have been satisfied by the discovery of a method for the casting of highly filled plastics comprising polymethyl methacrylate, comprising the steps of:

preparing a filler suspension by combining from 30 to 80 wt %, based on the amount of filler suspension, of at least one particle-shaped, inorganic filler with a polymer precursor under high-speed stirring, wherein the polymer precursor comprises methyl methacrylate and a polymethyl methacrylate prepolymer, wherein the filler suspension further comprises from 1 to 20 parts by weight, based on the amount of filler suspension, of a colored, filled, comminuted polymer material having a density precisely adapted to the density of the filler suspension and wherein the comminuted polymer material comprises a polymer component which is highly crosslinked; and polymerizing the filler suspension by contacting the filler suspension with at least one radical initiator.

DETAILED DESCRIPTION OF THE PREFERRED EMBODIMENTS

The present invention relates to a method for the production of highly filled plastics based on polymethyl methacrylate according to the casting method, beginning with a polymer precursor (PVS), containing methyl methacrylate and a polymethyl methacrylate prepolymer, which is converted into a filler suspension (FSS) by the addition of at least one particle-shaped, inorganic filler (FS) in fractions of 30 to 80 wt % (based on the filler suspension) under high-speed stirring and is polymerized in a suitable Mold with the addition of at least one radical initiator. In the process of the present invention, variously colored, filled, comminuted polymer material GP is added to the filler suspension FSS in quantities of i to 20 parts by weight (based on the filler suspension FSS) while stirring, with the requirement that the density of the comminuted material GP is adapted precisely to the density of the filler suspension and that the polymer component of the comminuted material GP is crosslinked.

The goals of the present invention are achieved based on a combination of appropriate measures, such as:

1. The comminuted material is precisely adapted in its density to the density of the filler suspension FSS. In this way, the sedimentation is also hindered for longer periods of time, and a sedimentation with varying degrees of strength and varying sizes of particles does not take place. The density adaptation is appropriately controlled by means of the filler concentration in the comminuted material.

2. To avoid an increase in the viscosity within the processing time, the comminuted material polymer crosslinked with approximately 10 wt % of at least one crosslinking monomer.

The comminuted material GP has, as a rule, a particle diameter in the range of from 0.02 mm to approximately 5 mm. It is preferably obtained from the same type of polymerized material as that from which the filler suspension FSS is formed, but while observing the required features with respect to density adaptation and crosslinking.

The density adaptation is controlled by means of the filler concentration in the comminuted material. As one exemplary embodiment, a concentration of 66 wt % of aluminum hydroxide as a particle-shaped, inorganic filler FS in the filler suspension FSS can be used, whereas approximately 40–45 wt % of the same are found in the comminuted material GP. The production of the polymeric comminuted material GP essentially takes place according to the same method as the production of the PMMA basic material, with the same monomers preferably being used. However, the comminuted material GP is always crosslinked by the addition of one or more crosslinking monomers. As crosslinking agents, conventional monomers containing several polymerizable groups in the molecule can be used. Such monomers include the (meth)acrylic acid ester of multivalent alcohols or allyl esters, (see H. Rauch-Puntigam, Th. Voelker, *Acrylic and Methacrylic Compounds*, Springer-Verlag 1986), such as ethylene glycol dimethacrylate, 1,4-butanediol dimethacrylate, trimethylolpropane trimethacrylate, ethylene glycol diacrylate, and trimethylolpropane triacrylate.

The fraction of crosslinking monomers is thus relatively high, preferably at least 1 wt % end up to 20 wt %, more preferably 8–12 wt %, most preferably around 10 wt %, based on total monomer. In the uncrosslinked state, the weight average molecular weight lies in the range of $2\times 10^5$ to $5\times 10^6$ daltons.

The fine-particle, inorganic materials of the present invention, which are appropriate also for cast resins, are suitable as fillers FS. The content of fillers FS is adjusted in such a way that the comminuted material GP has precisely the density of the filler suspension FSS. The polymeric comminuted material GP is advantageously obtained from an appropriately dyed polymer. Conventional pigments or dyes can be used as dyes FM.

Suitable dyes FM include iron oxide, titanium dioxide, zinc white, ultramarine blue, Cu phthalocyanines, and carbon black. The pigments can also be introduced into the prepolymer phase is prepared dispersions with the aid of suitable dispersants. In general, the content of the dyes FM lies in the range of 0.2 to 5 wt %, based on the polymer based on the comminuted material GP.

The production of the filler suspension FSS can be carried out using known procedures (see European Patent No. B 218,866; West German Patent No. A 4,225,309). As an example of a suitable prepolymer, PMMA can be used which can optionally contain minor fractions of appropriately selected comonomers, such as other acrylic and/or methacrylic acid esters, in particular $C_1$–$C_8$ alkyl esters. The fraction of the prepolymers lies at 5–30 wt %, based on the total amount of polymerizable materials.

Furthermore, the filler suspension FSS also contains crosslinking monomers. Any conventional crosslinking monomers can be used, such as those with at least two polymerizable vinyl groups in the molecule (see H. Rauch-Puntigam, Th. Voelker, *Acrylic and Methacrylic Compounds*, page 184, Springer-Verlag, 1967). Suitable examples include ethylene glycol dimethacrylate, 1,4-butanediol dimethacrylate, triethylene glycol dimethacrylate, trimethylolpropane trimethacrylate, or the corresponding acrylates and allyl compounds, such as allyl methacrylate or triallyl cyanurate. The content of crosslinking monomers in the filler suspension FSS is 0.01 to 10 wt %, preferably 0.1 to 5 wt %, based on the monomer content.

The filler suspension FSS has (based on prepolymer plus monomers) a content of over 60 wt %, preferably 80 to 100 wt %, of methyl methacrylate. Other copolymerizable comonomers can also be present. Suitable comonomers include (meth)acrylic acid esters, vinyl aromatics, and heterocyclic vinyl compounds, such as styrene, ring-substituted styrenes, α-methylstyrene, vinylpyrrolidone, vinylimidazole, acrylonitrile, methacrylonitrile, and vinyl esters, such as vinyl acetate or vinyl propionate. In general, in addition to the MMA, the fraction of the (meth)acrylic acid esters and the crosslinking monomers, which, together with MMA, can advantageously make up as much as 100 wt % of the entire polymer precursor, predominates. Particularly preferred is a mixture of the monomer methyl methacrylate and a crosslinking monomer, such as ethylene glycol dimethacrylate, wherein the weight ratio is advantageously between 95:5 and 99.9:0.1. In many cases, the polymer precursor PVS contains the monomers, which also form the prepolymer and in the same proportions. They can, however, also be different. The prepolymers can be dissolved or dispersed in the monomers. Preferably, the prepolymers are dissolved in the monomers. As a rule, the prepolymers have weight average molecular weights $M_w$ in the range between $2\times 10^4$ and $8\times 10^5$ daltons (determination by means of gel permeation chromatography, see An this regard: H. F. Mark et al., *Encyclopedia of Polymer Science and Technology* Vol. 10, pages 1 to 19, J. Wiley, 1987). For example, the prepolymer can be a copolymer of methyl methacrylate and methyl acrylate in the weight ratio 9:1 with a weight average molecular weight $M_w$ of approximately $2.5\times 10^5$ daltons.

Primarily, aluminum oxides, aluminum hydroxides, or aluminum oxide hydrates can be used as particle-shaped, inorganic fillers FS. Other known particle-shaped fillers can also be used, such as alkaline-earth metal oxides, silicon oxide, and/or titanium oxide in various modifications, clays, silicates, metals or metal alloys, metal oxides, synthetic materials, such as ceramics, glass powder, porcelain, slag, or finely distributed silicon dioxide, quartzes, kaolin, talc, mica, feldspar, apatite, barite, gypsum, chalk, limestone, dolomite, or a mixture of the aforementioned components.

Preferably, in average particle size of the filler particles of 100 μm (diameter), more preferably 75 μm, is not exceeded with the inorganic fillers. In one particular embodiment, the filler is a mixture of at least 2 components, hose average particle sizes are created in such a way that he size distribution between the average sizes of the large filler particles and those of the small filler particles is between 10:1 and 2:1, preferably between 6:1 and 4:1.

Filler particles with a particle size of <0.1 μm should not make up more than 10% of the volume of all filler particles. The particle size is determined according to conventional methods, wherein for the particle size determination, the largest dimensions of the particles are used as diameters (see, for example, B. Scarlett, *Filtration & Separation*, page 215, 1965). The quantitative ratio between large and small filler particles generally is between 4:1 and 1:4, preferably between 2:1 and 1:2, with particular preference at 1:1.

The inorganic filler is preferably created in such a way that the cured cast resin exhibits an elastic shear modulus of at least 5 $GNm^{-2}$, preferably of at least 10 $GNm^{-2}$, wherein the intended use of the cast resins is kept in mind during the adjustment of the mechanical characteristics.

The filler fraction of the cast resins of the invention under consideration is preferably at least 40 wt %. In general, a fraction of 80 wt % is not exceeded, with a filling fraction being most preferred at 50 to 80 wt % is indicated. The production of the fillers in the appropriate particle sizes can be carried out according to known processes, such as, breaking and comminuting.

The Production of the Cast Resin Suspensions

In the production of cast resin suspensions, one begins with the liquid polymer precursor, which contains the monomers and the prepolymer and which forms the liquid organic phase. With the aid of a mechanical dissolver, the inorganic filler FS is introduced into the organic phase. When using fractions of various particle sizes, the filler particle fractions can be individually added, wherein the sequence of the addition of filler particles of different sizes is not stipulated. Preferably, the process is concluded after 10 min. Afterwards, the suspension is dispersed with the dissolver or an equivalent dispersing unit over a time period of approximately 10 min, wherein the rotational speed of the dissolver is approximately 10 to 20 m/sec. In general, the inorganic fillers of the organic phase are added in such a way that the viscosity does not exceed a value of approximately 10 Pa.sec.

The addition of the comminuted material GP preferably occurs at room temperature, together with the polymerization auxiliaries. Polymerization auxiliaries, such as conventional polymerization initiators, are added in quantities of 0.1 to 5 wt %, based on the monomers M of the suspension FSS. As preferred polymerization initiators, radical-forming agents are used, whose decomposition into radicals can be induced thermally or by means of redox processes. Basically, radical initiators which supply a high radical flow at low temperatures are most suitable (see J. Brandrup, E. H. Immergut, *Polymer Handbook*, 3rd Ed., Chapter III, pages 1 to 65, J. Wiley, 1989). Preferably, the initiators are added just before pouring and curing of the cast resin suspensions.

It may be advantageous if the cast resin suspension contains internal and/or external release agents, which prevent the adherence of the cured cast resin to the form and provide good surface characteristics of the cast resin molded articles. Examples of internal release agents are fatty acids and their alkali metal and alkaline-earth metal salts and alkyl phosphates and their neutralized derivatives. Among suitable external mold release agents are coatings on the molds, such as polytetrafluoroethylene, polyorganosiloxane, or polyvinyl alcohol.

Production of the Cast Resin Molded Articles

The cast resin suspensions, in accordance with the invention, mixed with the polymerization initiators, can be cast very well, for example, in conventional cast molds. Advantageously, the suspension is evacuated before the filling. The curing step (=polymerization of organic phase B)) preferably takes place thermally by heating at 50° to 80° C. for 20 to 60 min. The curing step can take place with the use of pressure and also without pressure.

The various molds can be filled with the cast resin suspensions in accordance with the invention, and a technically satisfactory polymerization can be carried out. In this way, plates, bowls, wash basins, kitchen sinks, toilet bowls, molded articles for the construction industry, machine foundations, containers, and so forth, can be produced.

Another advantageous embodiment of the invention is continuous plate production on a conveyer belt. The cast resin suspension mixed with a suitable polymerization initiator is placed on a moving conveyer belt with lateral boundaries, wherein it is quickly distributed and leveled because of its low viscosity and its low structural viscosity. Afterwards, the surface of the suspension is covered with a second metal belt. The curing of the suspension can be carried out thermally by heating the two metal belts or by using suitable redox initiators also without external heating.

The residual monomer contents of the cured cast resins lie below 1 wt %, based on the total monomer fraction, preferably below 0.5 wt %.

Since the cast resin suspensions in accordance with the invention can be cast very well in conventional cast molds, a great mold variety, in particular with complicated molds, is available, providing a satisfactory and complete polymerization.

The consistent reaction of the measures described above, as well as with standing times of the liquid phase of, for example, 2 h, leads to a filled polymer with uniform structure on the upper and lower sides of the formed plates in the casting process. The possibility of the use of the upper and lower sides of a plate, preferably one with granite character, provide a significant technical advantage.

Having generally described this invention, a further understanding can be obtained by reference to certain specific examples which are provided herein for purposes of illustration only and are not intended to be limiting unless otherwise specified.

EXAMPLES

EXAMPLE 1

Production of the Highly Filled Plastic Plate Having a Granite Appearance 30 g of a PMMA bead polymer with $n_{spec/c}$=130–140 (PLEXIGUM® M920, manufacturer: Röehm GmbH) were dissolved in 296.99 g and 0.01 g 2,4-dimethyl-6-tert-butylphenol at approximately 50° C. within 5 h and afterwards cooled to room temperature. In this group, 5.0 g stearic acid and 3.0 g ethylene glycol dimethacrylate were dissolved. 332.5 g ALCOA® C33 (aluminum hydroxide with an average particle size of 45 μm), 332.5 g ALCOA® C333 (aluminum hydroxide with an average particle size of 8 μm), and 5 g highly disperse, amorphous silicon dioxide (product AEROSIL® 200, manufacturer: Degussa) were introduced into the syrup, using the dissolver, with moderate stirring. Afterwards, the suspension was dispersed with the dissolver at 20 m/sec for approximately 10 min. 90.2 g comminuted material in accordance with Example 2, and 19.8 g comminuted material in accordance with Example 3 were stirred into the suspension. The stirring time was approximately but can also be clearly prolonged. Subsequently, 5 g bis(4-tert-butylcyclohexyl) peroxydicarbonate and 1 g 2,2'-azobis(isobutyronitrile) were dissolved, and the enclosed air bubbles were removed from the suspension by applying a vacuum for a very short time.

A chamber was constructed from two highly polished and chrome-plated metal plates (thickness 4 mm) with the aid of a round PVC cord (diameter 4.2 mm). The suspension was poured into the intermediate space of the metal chamber, and the chamber closed.

The filled chamber was placed in a water bath of 65° C. for a polymerization time of 20 min. Subsequently, final polymerization was carried out in a drying oven for 30 min at 105° C. Afterwards, the chamber was released, and the cured casting removed. The plate casting had high-luster surfaces on both sides, was not bent, and exhibited a visually identical granite appearance on both sides.

EXAMPLE 2

Production of White Comminuted Material 80 g of a PMMA bead polymer (PLEXIGUM® M920) and 0.01 g 2,4-dimethyl-6-tert-butylphenol were dissolved in 410 g MMA at approximately 50° C. within 5 h and subsequently cooled to room temperature. 5.0 g stearic acid and 50 g ethylene glycol dimethyacrylate were dissolved in this MMA/PMMA syrup. 210 g aluminum hydroxide (Martinal® ON 310) and 210 g Martinal® OD of the Martinswerke Company, 20 g highly disperse, amorphous silicon dioxide (Aerosil® 200) and 15 g titanium dioxide ($TiO_2$ RN 56, manufacturer: Kronos GmbH) were incorporated into the syrup, using the dissolver, with moderate stirring. Afterwards, the suspension was dissolved with the dissolver at approximately 20 m/sec for approximately 10 min. In the suspension cooled to room temperature, 1 g bis(4-tert-butylcyclohexyl) peroxydicarbonate were dissolved and the enclosed air bubbles were removed from the suspension by applying a vacuum for a very short time.

A chamber was constructed from two highly polished and chrome-plated metal plates (thickness 4 mm) with the aid of a round PVC cord (diameter 6.0 mm). The suspension was poured into the intermediate space of the metal chamber, and the chamber closed.

The filled chamber was placed in a water beth of 45° C. for a polymerization time of 120 min. Subsequently, final polymerization was carried out in a drying oven for 30 min at 105° C. Afterwards, the chamber was released and the cured casting removed.

The casting was broken into small pieces, and the small pieces comminuted in a suitable mill. Then, the desired comminuted material fractions were screened out.

EXAMPLE 3

Production of Black Comminuted Material

Black comminuted material was produced in a manner analogous to Example 2, wherein instead of titanium dioxide, 15 g iron(III) oxide (product BAYFEROX® 318M from Bayer AG) were used.

This application is based on German Patent Application 195 07 875.6, filed with the German Patent Office on Mar. 7, 1995, the entire contents of which are hereby incorporated by reference.

Obviously, additional modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A method for the casting of highly filled plastics comprising polymethyl methacrylate, comprising:
   preparing a filler suspension by combining from 30 to 80 wt %, based on the amount of filler suspension, of at least one particle-shaped, inorganic filler with a polymer precursor under stirring, wherein the polymer precursor comprises methyl methacrylate and a polymethyl methacrylate prepolymer, wherein the filler suspension further comprises from 1 to 20 parts by weight, based on the amount of filler suspension, of a colored, filled, comminuted polymer material having a density precisely adapted to the density of the filler suspension and wherein the comminuted polymer material comprises a polymer component which is crosslinked; and
   polymerizing the filler suspension by contacting the filler suspension with at least one radical initiator.

2. The method according to claim 1, wherein the polymer component of the comminuted material is crosslinked with approximately 1 to 20 wt % of at least one crosslinking monomer.

3. The method according to claim 2, wherein the polymer component of the comminuted material is crosslinked with approximately 10 wt % of at least one crosslinking monomer.

4. The method according to claim 1, wherein the comminuted polymer material has a particle diameter in a range of from 0.02 to 5 mm.

5. The method according to claim 1, wherein at least 2 differently colored comminuted polymer materials are added to the filler suspension.

6. The method according to claim 1, wherein the particle-shaped inorganic filler is aluminum hydroxide.

7. The method according to claim 1, wherein the filler suspension further comprises added highly disperse, amorphous silicon dioxide.

8. The method according to claim 1, wherein the methyl methacrylate content of the filler suspension, based on total monomer and prepolymer, is at least 60 wt %.

9. The method according to claim 8, wherein the methyl methacrylate content of the filler suspension, based on total monomer and prepolymer, is from 80 to 100 wt %.

10. The method according to claim 1, wherein the filler suspension further comprises, in addition to methyl methacrylate, one or more copolymerizable comonomers.

11. The method according to claim 10, wherein the one or more copolymerizable comonomers are selected from the group consisting of (meth)acrylic acid esters, styrenes, α-methyl styrene, vinylpyrrolidone, vinylimidazole, acrylonitrile, methacrylonitrile and vinyl esters.

12. The method according to claim 1, wherein the methyl methacrylate prepolymer has a weight average molecular weight, Mw of from $2 \times 10^4$ to $8 \times 10^5$ daltons.

13. The method according to claim 1, wherein the methyl methacrylate prepolymer makes up from 5 to 30 wt % of the polymer precursor, based on the total amount of polymerizable materials.

14. The method according to claim 1, wherein the filler suspension further comprises one or more additional crosslinking monomers.

15. The method according to claim 14, wherein the one or more additional crosslinking monomers are selected from the group consisting of ethylene glycol dimethacrylate, 1,4-butanediol dimethacrylate, triethylene glycol dimethacrylate, trimethylolpropane trimethacrylate, and the acrylates and allyl derivatives thereof.

16. The method according to claim 1, wherein the particle-shaped inorganic filler is present in an amount of from 40 to 80 wt %.

17. The method according to claim 1, wherein the particle-shape inorganic fillet is present in an amount from 50 to 80 wt %.

18. The method according to claim 1, wherein the polymerization step is performed by heating at 50° to 80° C. for 20 to 60 min in a east mold into which the filler suspension has been placed.

19. The method according to claim 1, wherein the filler suspension is placed on a moving conveyer belt having lateral boundaries, the filler suspension is then covered by a second metal belt and the polymerization step carried out by heating the filler suspension between the moving conveyer belt and second metal belt or by radical polymerization of the filler suspension between the moving conveyer belt and second metal belt without external heating.

20. The method according to claim 1, wherein the highly filled plastic has a residual monomer content of less than 1 wt %, based on total monomer fraction.

* * * * *